US006244747B1

United States Patent
Caudle

(10) Patent No.: US 6,244,747 B1
(45) Date of Patent: Jun. 12, 2001

(54) CONTOURED POUCH WITH POURABLE SPOUT, AND APPARATUS AND PROCESS FOR PRODUCING SAME

(75) Inventor: Timothy G. Caudle, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/410,353

(22) Filed: Sep. 30, 1999

(51) Int. Cl.[7] ........................................ B65D 30/10
(52) U.S. Cl. .................... 383/200; 383/104; 383/906; 383/907; D9/305
(58) Field of Search ........................... 383/37, 104, 102, 383/200, 906, 907; D9/305

(56) References Cited

U.S. PATENT DOCUMENTS

| 2,935,241 | * | 5/1960 | Brady ................................ 383/37 X |
| 2,999,627 | * | 9/1961 | Reinhardt ........................ 383/906 X |
| 3,448,915 | * | 6/1969 | Schwarzkopf .................... 383/37 |
| 4,361,235 | * | 11/1982 | Gautier ............................. 383/104 X |
| 4,974,732 | * | 12/1990 | Sullivan et al. ................. 383/906 X |
| 5,352,043 | * | 10/1994 | Takagaki et al. ................... 383/104 |
| 5,547,284 | * | 8/1996 | Imer ................................. 383/906 X |
| 5,971,613 | * | 10/1999 | Bell .................................. 383/104 X |
| 6,145,282 | | 11/2000 | Tsuruta . |

FOREIGN PATENT DOCUMENTS

| 2 573 391 | * | 5/1986 | (FR) .................................. 383/906 |
| 5-77838 | * | 3/1993 | (JP) .................................. 383/104 |

* cited by examiner

Primary Examiner—Jes F. Pascua
(74) Attorney, Agent, or Firm—Mark B. Quatt

(57) ABSTRACT

The present invention relates to sealed pouches, and apparatus and processes for producing the same. The pouch includes contoured first and second lateral edges, with each lateral edge having concave and convex surfaces. The concave surface of the first lateral edge is substantially opposite the convex surface of the second lateral edge and the convex surface of the first lateral edge is substantially opposite the concave surface of the second lateral edge. Accordingly, a distance between the first and second lateral edges is substantially the same for all elevations of the pouch.

19 Claims, 16 Drawing Sheets

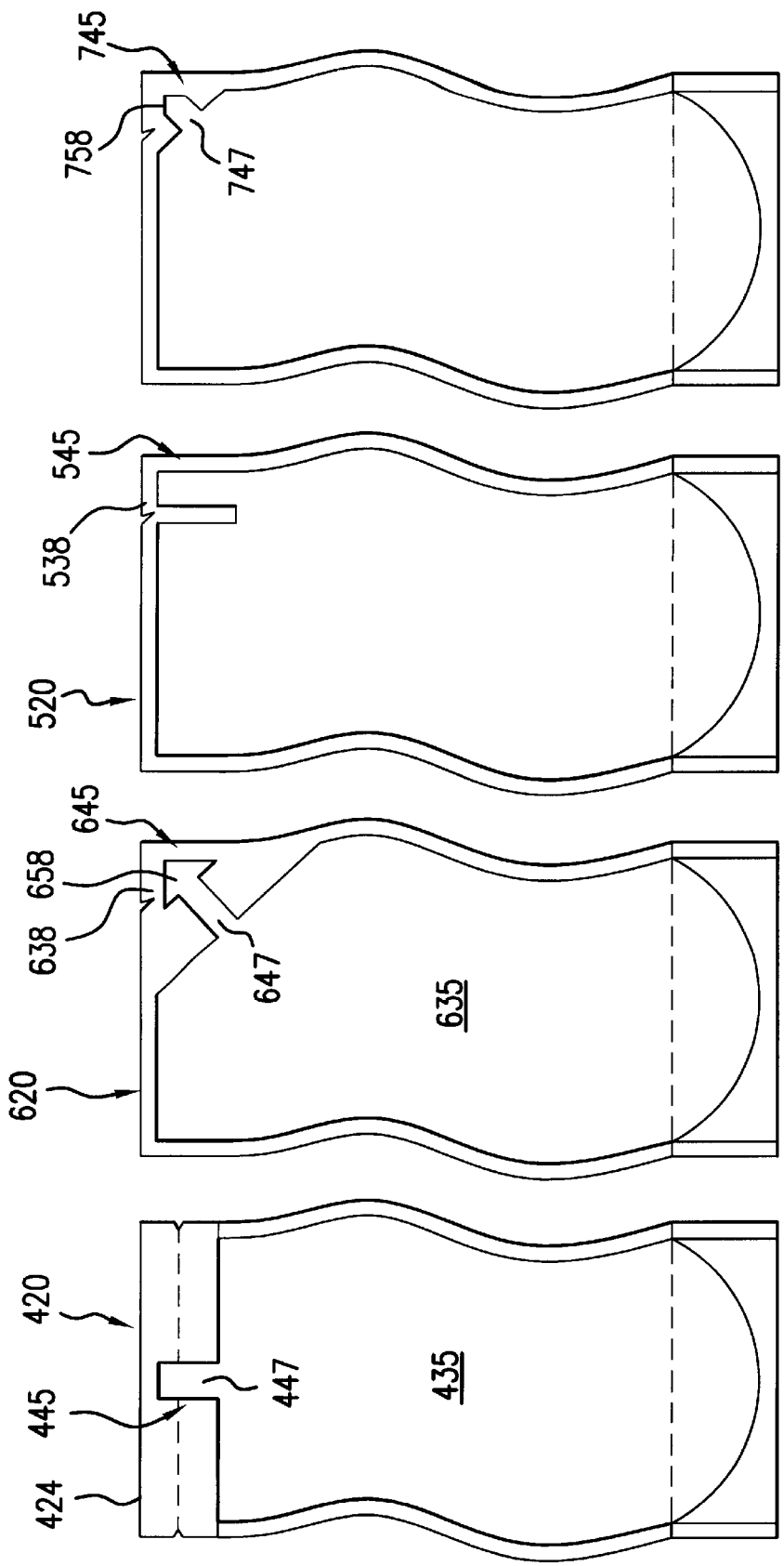

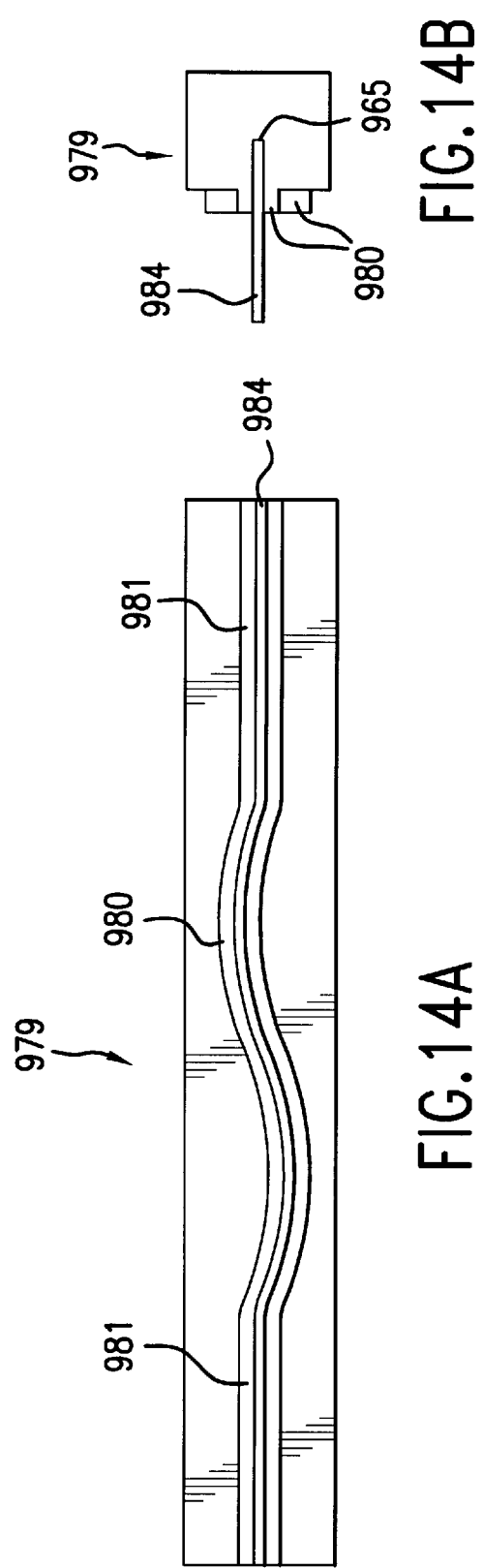

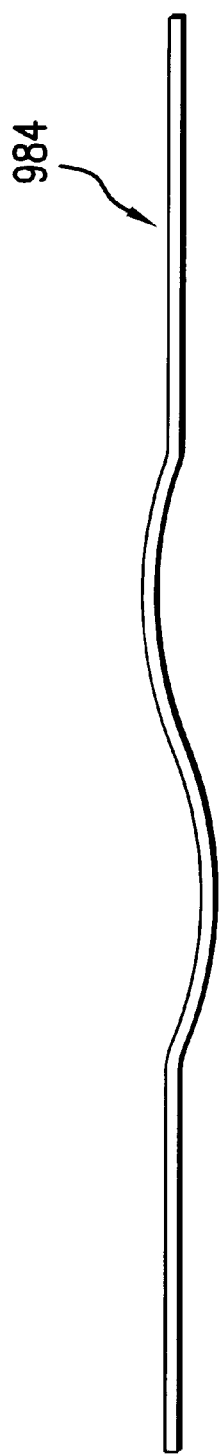
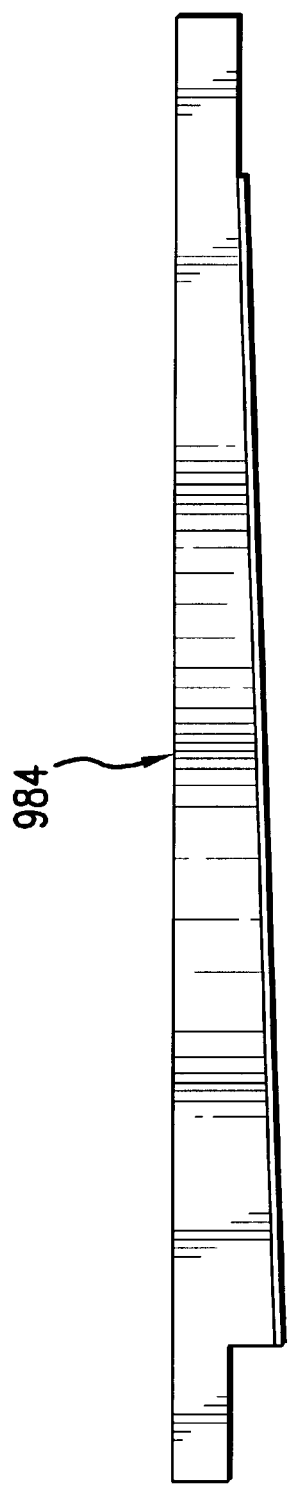

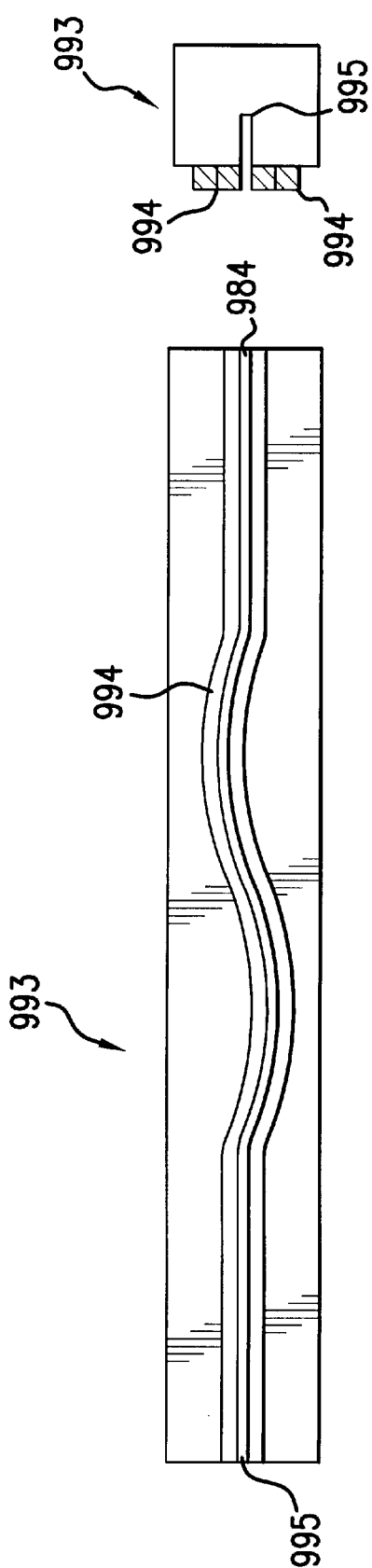

CONTOURED POUCH WITH POURABLE SPOUT, AND APPARATUS AND PROCESS FOR PRODUCING SAME

FIELD OF THE INVENTION

The present invention relates to sealed pouches, and apparatus and processes for producing the same. In particular, the present invention relates to sealed pouches having contoured edges and a pour spout, and apparatus and processes for producing the same from one or more films, laminates, or web materials.

BACKGROUND OF THE INVENTION

Pouches made from films or laminates, including polymers such as polyethylene or polypropylene, have found use in a variety of applications. For example, such pouches are used to hold low viscosity fluids (e.g., juice and soda), high viscosity fluids (e.g., condiments and sauces), fluid/solid mixtures (e.g., soups), gels, powders, and pulverulent materials. The benefit of such pouches resides, at least in part, in the fact that such pouches are easy to store prior to filling and produce very little waste when discarded. The pouches can be formed into a variety of sizes and shapes. One type of pouch is designed to lie on a supporting surface and is generally known as a pillow-type pouch. Alternatively, pouches have been described which include a base that permits the pouch to maintain an upright configuration.

Pouches can be assembled from flexible films, laminates, or web materials using form-fill-seal machines. Such machines receive the film, laminate, or web material and manipulate the material to form the desired shape. For example, one or more films, laminates, and/or web materials can be folded and oriented to produce the desired shape. Once formed, the edges of the pouch are sealed and the pouch filled. Typically, the film, laminate, or web material has at least one heat seal layer or adhesive surface which enables the edges to be sealed by the application of heat. During the sealing process, a portion of at least one edge of the pouch is left unsealed until after the pouch is filled. The pouch is filled through the unsealed portion and the unsealed portion is then sealed. Alternatively, the pouch can be filled and the unsealed portion simultaneously closed in order to provide a sealed pouch with minimal headspace.

Although a variety of pouches have been previously described, none of the known pouches provides ergonomically contoured edges yet can be manufactured on form-fill-seal machines without generating appreciable, and preferably without generating any, scrap material between subsequent pouches.

In light of the foregoing, it would be beneficial to provide a pouch that is ergonomically designed to be easily handled and that is able to be produced, filled, and sealed on a form-fill-seal machine without generating appreciable, and preferably without generating any, scrap material between subsequent pouches.

SUMMARY OF THE INVENTION

The shortcomings of the known pouches are overcome, at least to a large extent, by pouches in accordance with the present invention. In particular, the pouches of the present invention are ergonomically designed to be contoured and, thereby, easy to hold. Additionally, the pouches in accordance with the present invention can be produced, filled, and sealed on a form-fill-seal machine without generating scrap material between subsequent pouches.

In one of its aspects, the present invention relates to a flexible pouch comprising a first lateral edge and a second lateral edge. Each of the first and second lateral edges comprise concave and convex surfaces or contours. The concave and convex surfaces are arranged such that the concave surface of the first lateral edge is substantially opposite the convex surface of the second lateral edge and the convex surface of the first lateral edge is substantially opposite the concave surface of the second lateral edge. Alternatively, the first lateral edge comprises a concave surface and the second lateral edge comprises a convex surface, wherein the concave surface of the first lateral edge is substantially opposite the convex surface of the second lateral edge. In yet another embodiment, each of the first and second lateral edges may comprise a non-rectilinear portion arranged such that a distance between the first and second lateral edges is substantially the same for all elevations of the pouch. In one particular embodiment, at least one of the first and second lateral edges is substantially S-shaped. Each of the first and second lateral edges may optionally comprise at least one rectilinear portion positioned near the top or bottom of the pouch. The pouch may further optionally comprise a base for supporting the pouch in an upright position.

The pouch is optionally configured with a pour spout. In one embodiment, the pour spout provides a drinking straw which enables fluid to be conveniently dispensed from the pouch. In another embodiment, the pour spout is formed from a first sealed edge portion and a second sealed edge portion. A slit is formed within the first sealed edge portion to facilitate tearing of the first sealed edge. The second sealed edge portion contains a ribbed section and a non-ribbed section, wherein the non-ribbed section is substantially opposite the slit. In yet another embodiment, the pour spout is formed at a corner of the pouch between the first and second sealed edge portions of the pouch. A sealed section extends between the first and second sealed edge portions to define an opening. A slit is formed in the first sealed edge portion at a position intermediate the sealed section and the corner so that the distance between the first edge portion at the location of the slit to the second edge portion is not substantially less than the size of the opening.

In another of its aspects, the present invention relates to an apparatus for forming a pouch. The apparatus comprises a pouch forming component for assembling the pouch. In one particular embodiment, the pouch forming component forms a pouch from a single web of pouch-forming material. Bottom, top, and end sealing components are provided for sealing bottom, top, and lateral edges of the pouch, respectively. If desired, the top sealing component may comprise a pour spout forming section for forming a pour spout near the top edge of the pouch. The end sealing component is configured to provide a pouch with a lateral edge having a concave portion and a convex portion. In one particular embodiment, the end sealing component comprises a substantially S-shaped sealing surface. The end sealing component also optionally comprises a rib forming portion for forming lateral edges having ribbed sections. The apparatus also includes a filling component for filling the pouch with a fill material and a cutting component for cutting the lateral edge between subsequent pouches. The cutting component comprises a cutting knife having a concave cutting surface and a convex cutting surface.

In yet another of its aspects, the present invention relates to a process for forming a pouch wherein the pouch is assembled from at least one web of pouch-forming material. The assembled pouch is then sealed along a bottom edge, a top edge, and a first lateral edge or margin. The first lateral edge is sealed to provide a substantially S-shaped lateral edge. The pouch is then filled with a fill material and sealed along a second substantially S-shaped lateral edge to provide a sealed pouch. The sealed pouch can then be cut along the second substantially S-shaped lateral edge.

Additional features and embodiments of the present invention will become apparent to those skilled in the art in view of the ensuing disclosure and appended claims.

BRIEF DESCRIPTION OF THE DRAWINGS

The numerous objects and advantages of the present invention may be better understood by those skilled in the art by reference to the accompanying detailed description and the following drawings, in which:

FIG. 6 is a side elevational view of the pouch of FIG. 4 having an alternative arrangement for the pour spout;

FIG. 7 is a side elevational view of the pouch of FIG. 4 having another arrangement for the pour spout;

FIG. 8 is a side elevational view of the pouch of FIG. 4 having yet another arrangement for the pour spout;

FIG. 9 is a side elevational view of the pouch of FIG. 4 having still another arrangement for the pour spout;

FIG. 14*a* is a front elevational view of a cutting bar in accordance with the present invention;

FIG. 14*b* is a side elevational view of the cutting bar of FIG. 14*a*;

FIG. 15*a* is a front elevational view of a cutting blade in accordance with the present invention;

FIG. 15*b* is a top elevational view of the cutting blade of FIG. 15*a*;

FIG. 16*a* is a front elevational view of a cooling bar in accordance with the present invention;

FIG. 16*b* is a side elevational view of the cooling bar of FIG. 16*a*;

DETAILED DESCRIPTION OF THE INVENTION

Figure 1:
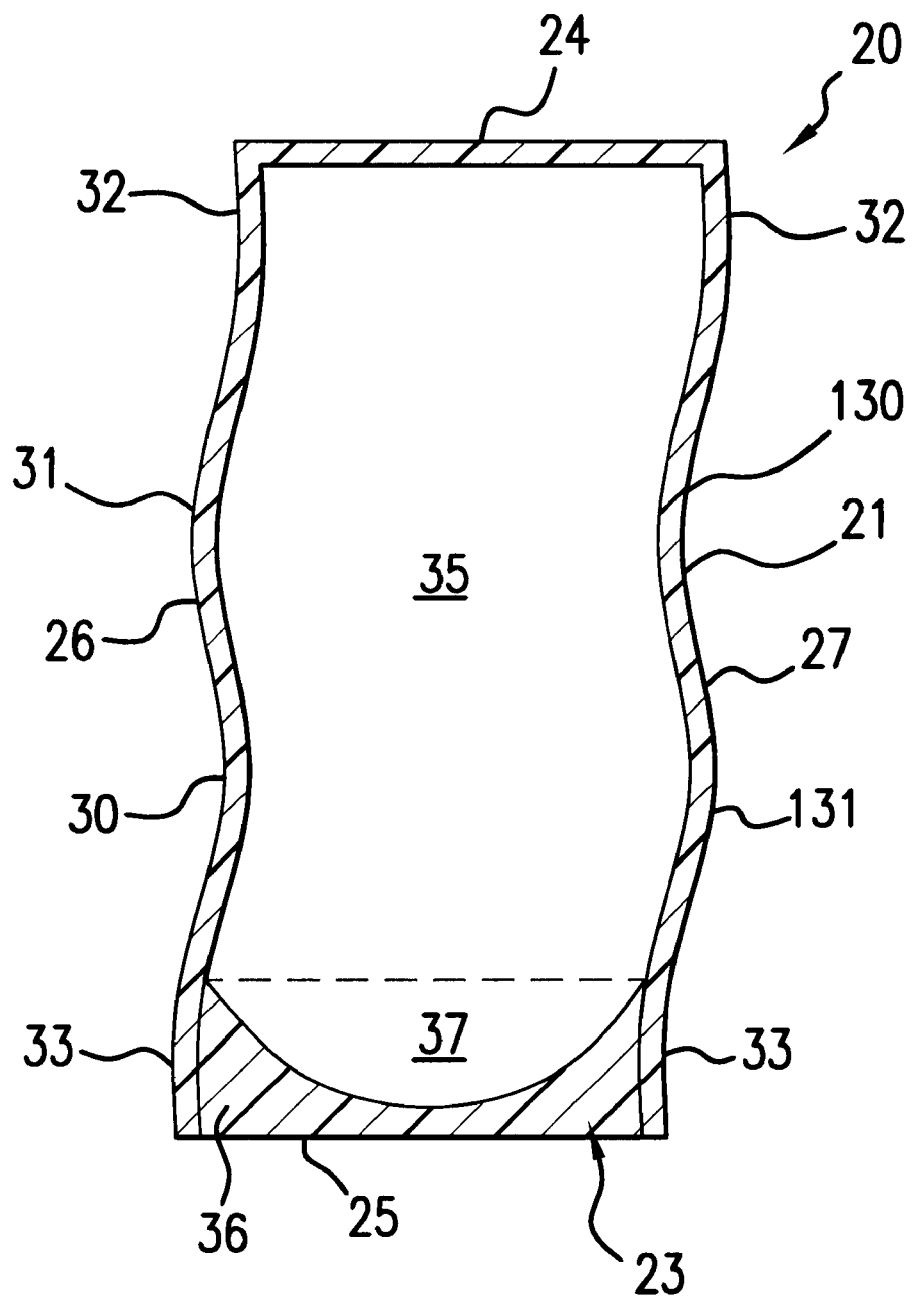
FIG. 1 is a side elevational view of a pouch in accordance with the present invention having contoured lateral edges.
Figure 19:
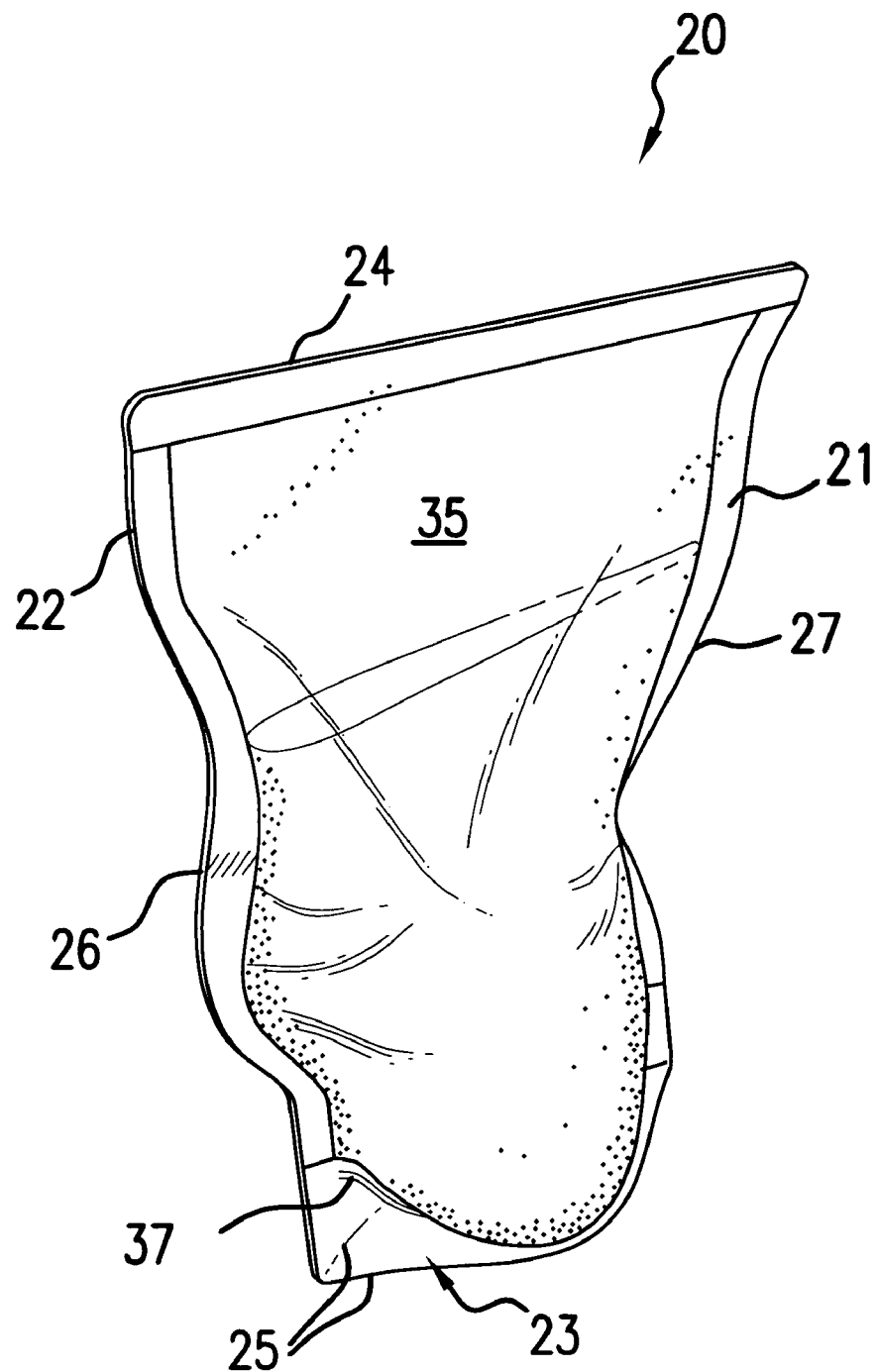
FIG. 19 is a perspective view of the pouch of FIG. 1.

A pouch in accordance with one embodiment of the present invention is depicted in FIGS. 1 and 19. The pouch 20 comprises a front panel 21, a rear panel 22, and an optional gusset 23. The optional gusset 23 is provided to produce a free-standing pouch. Each of the front and rear panels has a top edge, a bottom edge, a left lateral edge or margin, and a right lateral edge or margin. The front and rear panels are generally arranged such that each edge of one panel is substantially aligned with the corresponding edge of the other panel. Accordingly, the front and rear panels 21, 22 are arranged to produce the pouch 20 with a top edge 24, a bottom edge or edges 25, a left lateral edge or margin 26, and a right lateral edge or margin 27.

The left and right lateral edges 26, 27 of the pouch 20 are contoured. As shown in FIG. 1, each of the left and right lateral edges 26, 27 is shaped to provide a concave surface 30 and 130, respectively, and a convex surface 31 and 131, respectively. The concave surface 30 of the left lateral edge 26 is substantially opposite the convex surface 131 of the right lateral edge 27 and the convex surface 31 of the left lateral edge 26 is substantially opposite the concave surface 130 of the right lateral edge 27. Accordingly, the concave and convex surfaces of each lateral edge taken together form a non-rectilinear and, preferably, a generally S-shaped section. It will be appreciated by those skilled in the art that a distance between the left and the right lateral edges 26, 27 is substantially the same for all elevations of the pouch 20.

In addition, each of the left and the right lateral edges 26, 27 of the pouch 20 comprises optional first and second rectilinear portions 32, 33. The first rectilinear portion 32 of each lateral edge 26, 27 is positioned near the top edge 24 of the pouch 20. The second rectilinear portion 33 of each lateral edge 26, 27 is similarly positioned near the bottom edge 25 of the pouch 20. When the pouch 20 is configured to be free-standing, as shown, the second rectilinear portions 33 enhance the stability of the pouch when the pouch is filled and in its upright position.

The front panel 21, rear panel 22, and gusset 23 can be formed from any of a variety of films, laminates, or web materials, so long as the material is suitably flexible and capable of providing sufficient structural integrity. For example, the front panel 21, rear panel 22, and gusset 23 can be manufactured out of paper, paper composites, metallic films, co-extruded polymer films (such as FS-5150 and FS-5050 available from Cryovac/Sealed Air Corp, Duncan, S.C.), or laminated polymer films. In one embodiment, the front panel 21, rear panel 22, and gusset 23 are formed from a polyolefinic material having a thickness of between about 0.001 and about 0.01 inches (0.025–0.25 mm), and preferably between about 0.003 and about 0.006 inches (0.076–0.152 mm).

The front panel 21, rear panel 22, and gusset 23 are sealed along the top, bottom, and lateral edges 24, 25, 26, 27 to form an inner cavity 35. In order to provide a base for the pouch 20, portions 36 of the gusset 23 are sealed to the front and rear panels 21, 22. As shown in FIG. 1, the portions 36 of the gusset 23, which are sealed to the front and rear panels 21, 22, present a generally arcuate seal to the interior of the inner cavity 35 of the pouch 20. When the pouch 20 is filled and placed in an upright position, an unsealed portion 37 of the gusset 23 can deform to form the bottom of the inner cavity 35 of the pouch 20, as best shown in FIG. 19. The inner cavity 35 is capable of holding a variety of materials, including low viscosity fluids (such as water, juice, and soda), high viscosity fluids (such as condiments and sauces), fluid/solid mixtures (such as soups), gels, powders, and pulverulent materials. Sealing can be accomplished using any of a variety of conventional methods, including the use of conventional adhesives and/or heat sealing. Further, the seals produced can be either smooth or ribbed, as described in more detail below.

Figure 2:
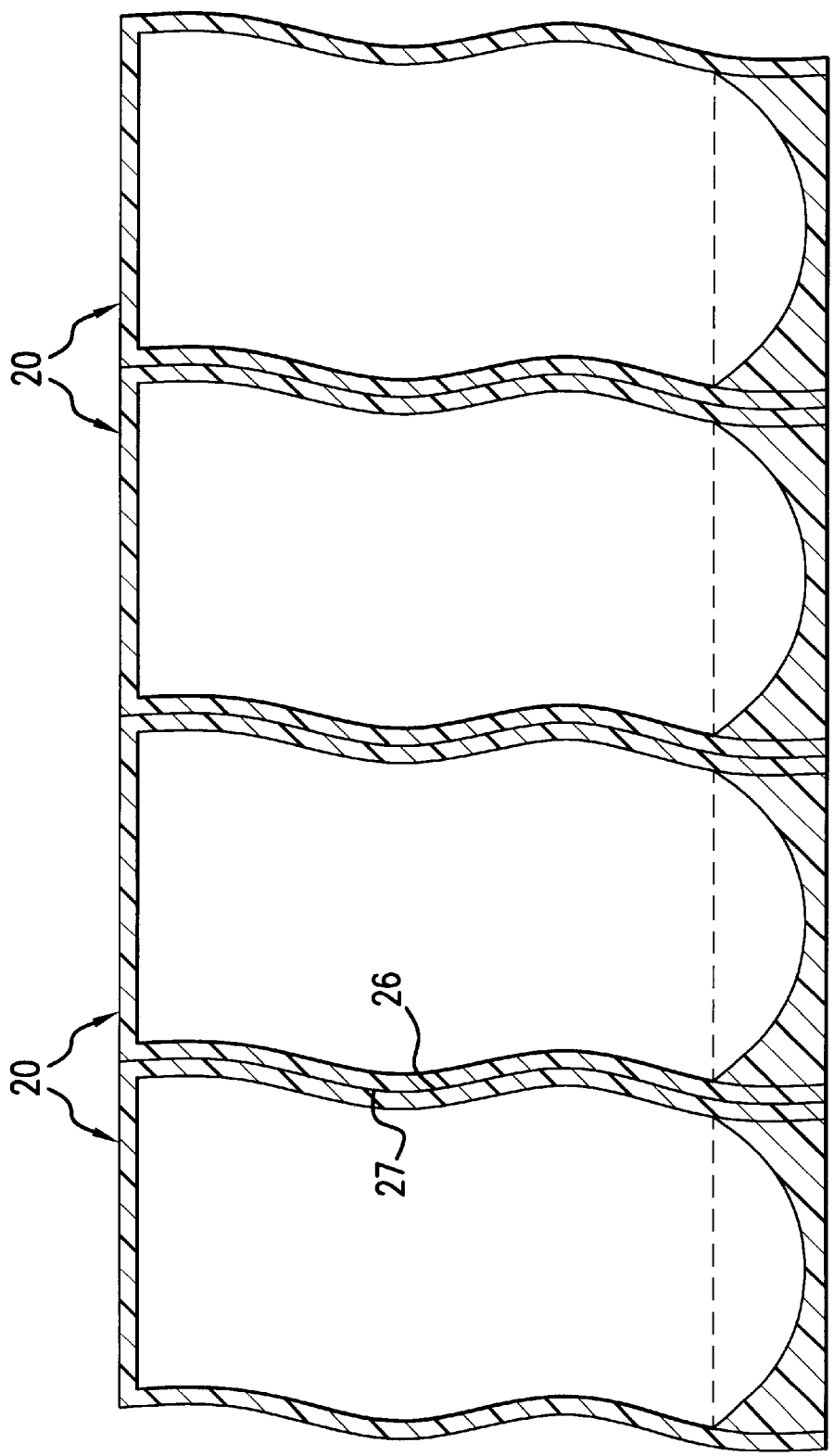
FIG. 2 is side elevational view of the pouch of FIG. 1 shown connected to adjacent pouches.

In FIG. 2, a series of pouches 20 of the type shown in FIG. 1 is illustrated. It is apparent from FIG. 2 that the left lateral edge 26 of one pouch matches perfectly with the right lateral edge 27 of a subsequent pouch. As a result, the pouch of FIG. 1 can be produced using, for example, form-fill-seal machines without generating any scrap material. Accordingly, the amount of material needed per pouch is reduced, thereby reducing the cost of producing each pouch.

Figure 3:
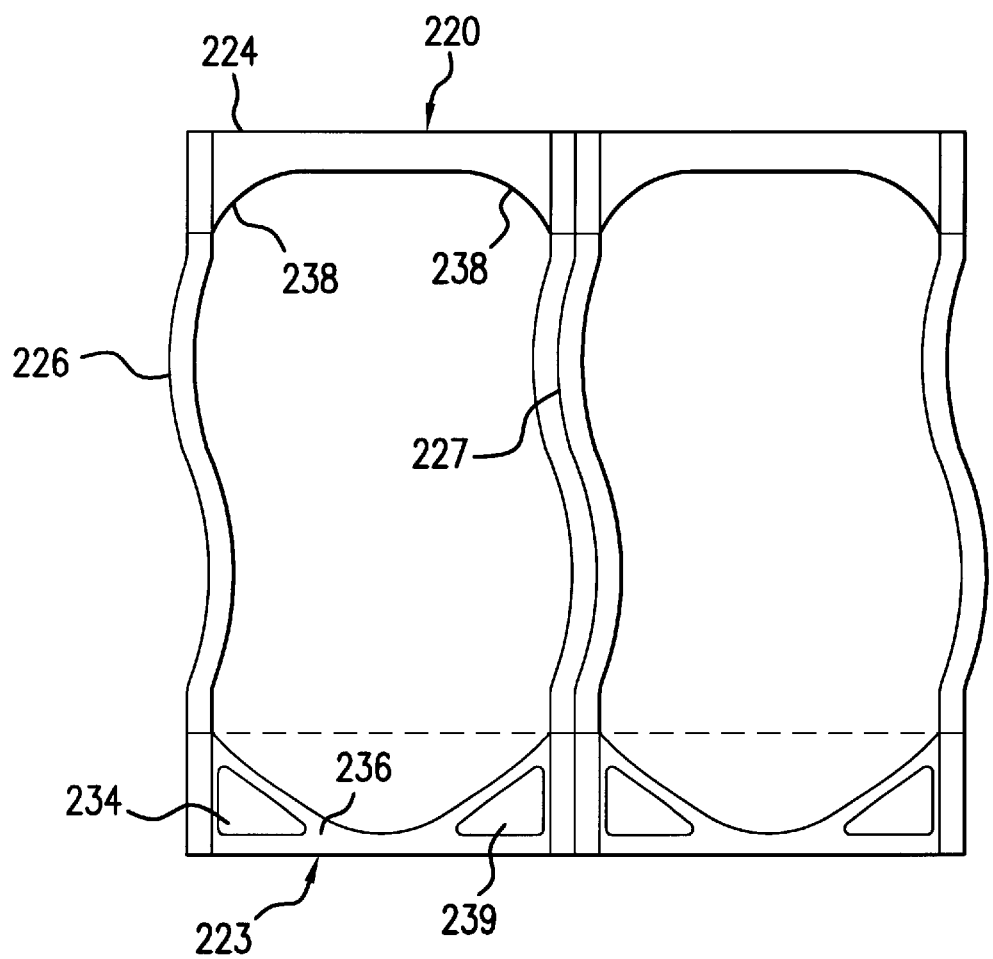
FIG. 3 is a side elevational view of a pouch in accordance with the present invention having contoured lateral edges, a rounded top seal, and unsealed base sections, shown adjacent to a subsequent pouch.

In FIG. 3, an alternative embodiment of a pouch in accordance with the present invention is depicted. The pouch 220 is in many respects identical to the pouch 20 described above in connection with FIG. 1. However, the top edge 224 of the pouch 220 of FIG. 3 is sealed to provide rounded corners 238 near the junctions made by the top edge 224 with the left and right lateral edges 226, 227. In addition, the portions 236 of the gusset 223 which are sealed to the front and rear panels comprise unsealed sections 239, as described in detail below with respect to unsealed sections 339 of pouch 320 in FIGS. 4 and 5.

Figure 4:
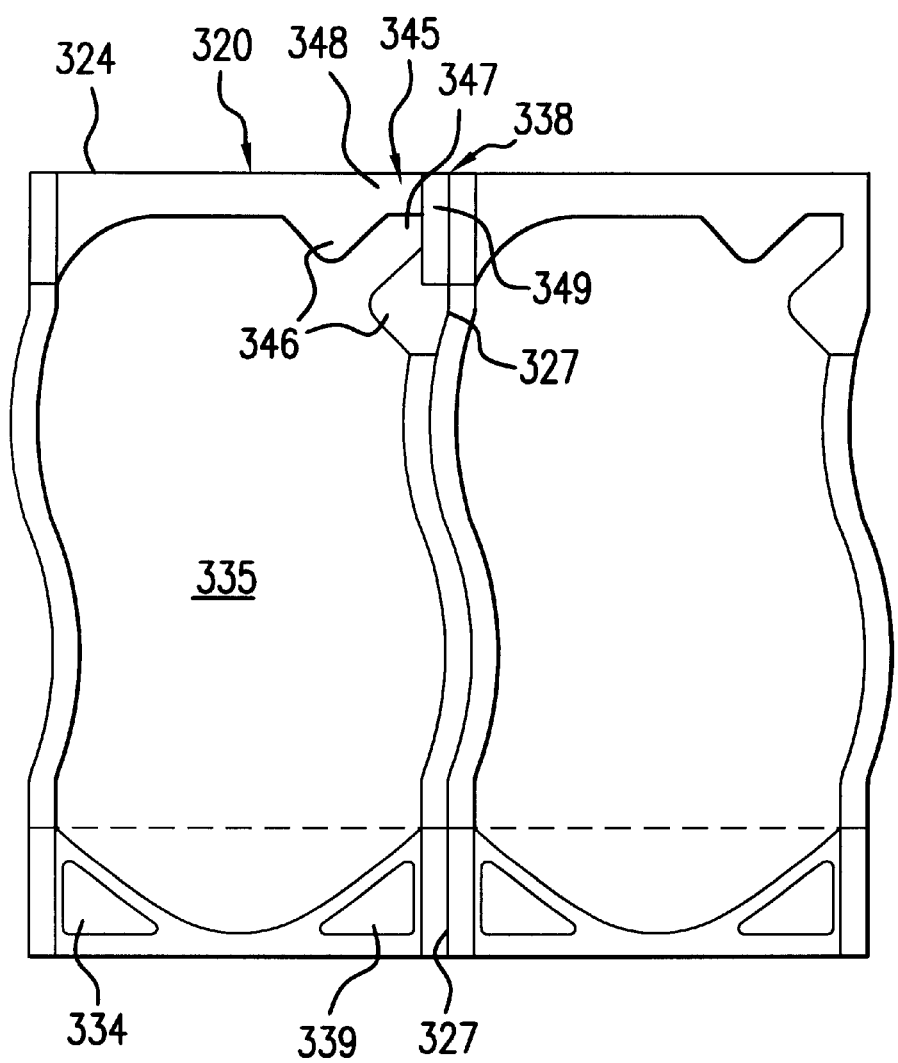
FIG. 4 is a side elevational view of a pouch in accordance with the present invention having contoured lateral edges, a rounded top seal, unsealed base sections, and a pour spout forming a drinking straw, shown adjacent to a subsequent pouch.

Yet another embodiment of a pouch in accordance with the present invention is shown in FIG. 4. The pouch 320 of FIG. 4 is identical to the pouch 220 of FIG. 3, except that the pouch 320 comprises a pour spout 345 formed near the junction of the top edge 324 and the right lateral edge 327 of the pouch 320. The pour spout 345 is formed from a sealed section 346 extending generally between the top edge 324 and the right lateral edge 327 of the pouch 320. The sealed section 346 is shaped to provide a channel 347 which is in fluid communication with the inner cavity 335 of the pouch 320 at one end. The other end of the channel 347 extends generally away from the inner cavity 335 toward a corner 338 of the pouch 320. Accordingly, the pour spout 345 provides a drinking straw which can be used to dispense fluids out of the inner cavity 335 of the pouch 320 either by sucking on the straw or by squeezing the pouch to force the fluid from the pouch.

An optional slit or notch 348 is provided within the top edge 324 of the pouch 320 to facilitate opening of the pour spout 345. When the right lateral edge 327 of the pouch 320 is to be ribbed, the right lateral edge 327 optionally contains a non-ribbed section 349 substantially opposite the slit 348. The slit 348 and non-ribbed section 349 cooperate to allow the corner 338 of the pouch 320 to be torn or removed to open the pour spout 345, while preventing the tear from exposing the inner cavity 335 of the pouch 320.

Figure 5:
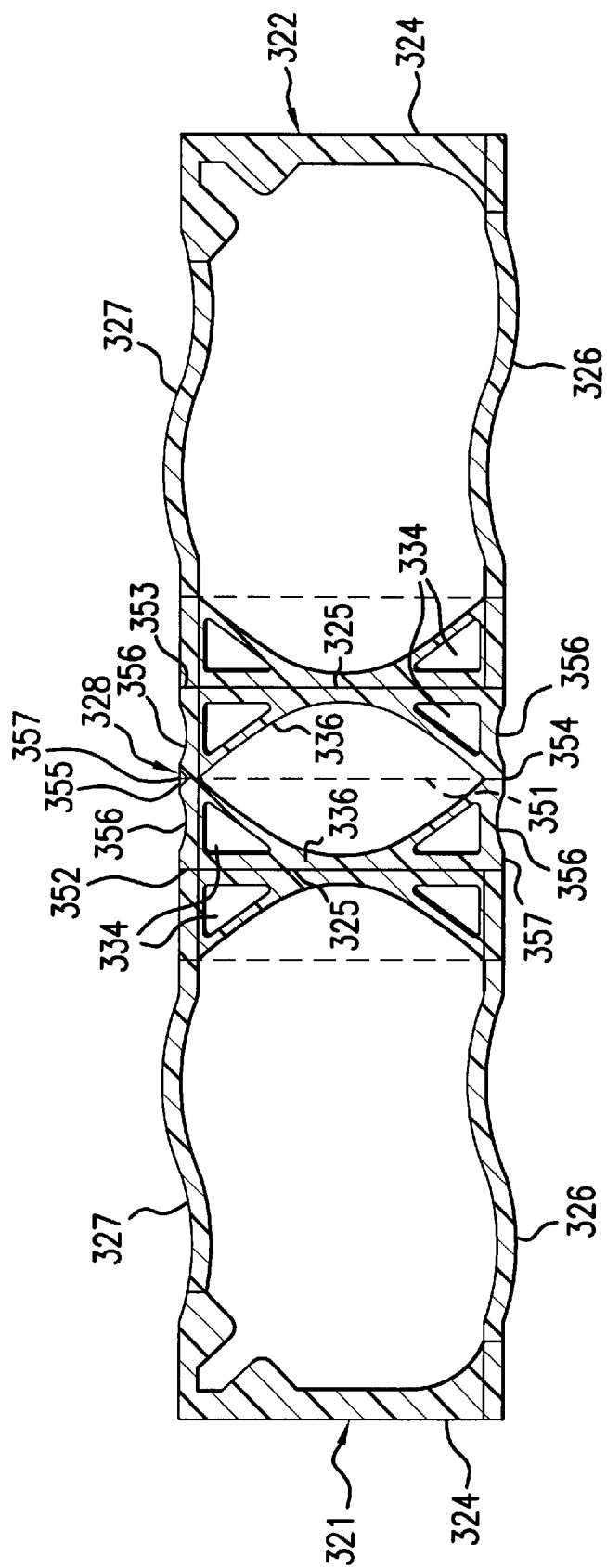
FIG. 5 is a side elevational view of the pouch shown in FIG. 4 depicted in an unsealed and flattened configuration.

In order to better appreciate the construction of the pouch 320 of FIG. 4, FIG. 5 is provided to depict a partially manufactured pouch of FIG. 4, shown in an unsealed and flattened configuration. The hatched portions of FIG. 5 denote those sections of the front panel 321, rear panel 322, and gusset 323 which are sealed in the finished pouch. FIG. 5 shows how the generally rectangular gusset 323 is folded to form the base of the pouch 320 when the gusset 323 is overlapped with the front and rear panels 321, 322. The gusset 323 is folded along its longitudinal axis to provide a V-shape having a folded edge 351 and two single or open edges 352, 353. The gusset 323 is positioned between the front and rear panels 321, 322 with one open edge 352 substantially overlapping the bottom edge of the front panel 321 and the second open edge 353 substantially overlapping the bottom edge of the rear panel 322. The folded edge 351 of the gusset 323 is positioned such that a first end 354 of the folded edge 351 intercepts the left edge 326 of the pouch 320 at a preselected position between the top and bottom edges 324, 325 of the pouch 320. Similarly, a second end 355 of the folded edge 351 intercepts the right edge 327 of the pouch 320 at about the same preselected position between the top and bottom edges 324, 325 of the pouch 320.

FIG. 5 also shows unsealed sections 339 which are formed when portions 336 of the gusset 323 are sealed to the front and rear panels 321, 322. By providing unsealed sections 339, the amount of adhesive or heat required to seal the gusset 323 to the front and rear panels 321, 322 is reduced. The use of less adhesive results in a decrease in production cost. In addition, when the panels are heat sealed, less heat results in less deformation of the pouch material and, hence, a superior finished product.

Also apparent from FIG. 5 is that the front panel 321, rear panel 322, and gusset 323 of the pouch 320 can be made either from individual sections of web material or from a single piece of folded web material. It will be apparent that when the front panel 321, rear panel 322, and gusset 323 are made from a single piece of web material that the edges, 352 and 353, are integrally formed with the bottom edges of the front and rear panels, 321 and 322 respectively. Accordingly, front and rear panels 321, 322 are made to oppose one another by folding.

FIG. 5 additionally illustrates optional cutouts 356 which can be provided in the lateral edges 357 of the gusset 323. The cutouts 356 are particularly beneficial when the pouch 320 is made from a single section of laminate material having a heat seal layer or adhesive along only one of its surfaces. Under such conditions, the cutouts 357 enable the heat seal layer or adhesive surface of the front panel 321 to directly contact the heat seal layer or adhesive surface of the rear panel 322, thereby providing a more secure seal.

Figure 10:
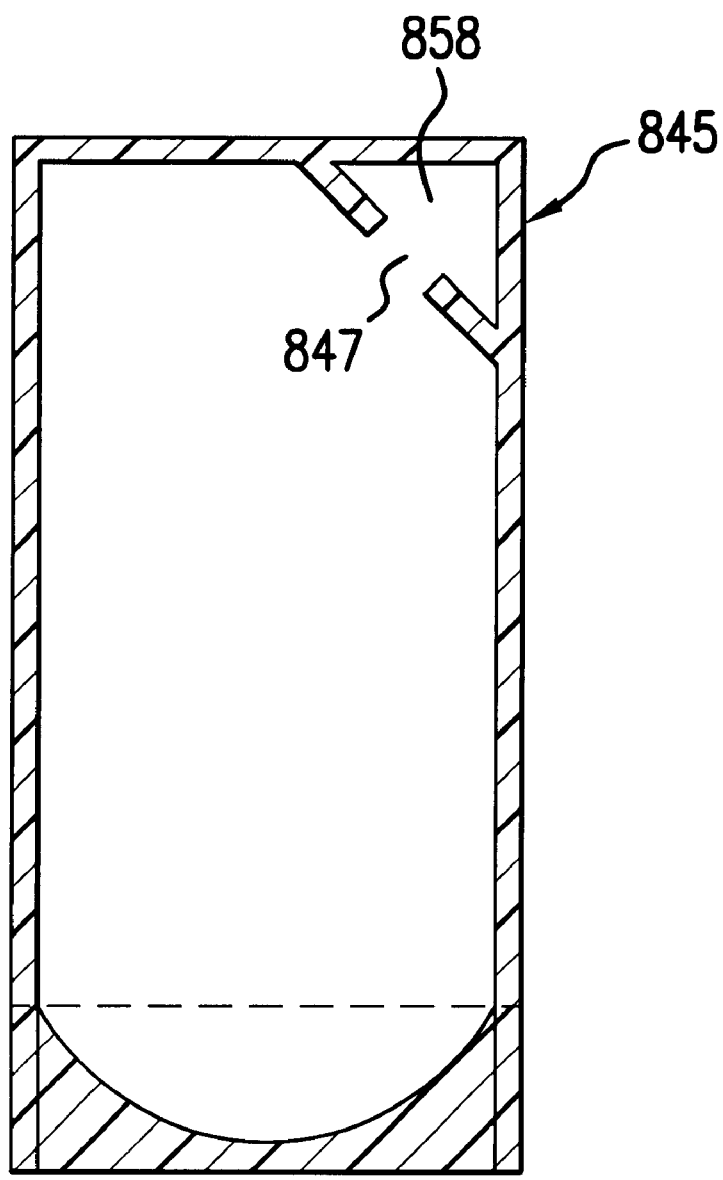
FIG. 10 is a side elevational view of a pouch in accordance with the present invention having a pour spout.

FIGS. 6–10 depict pouches in accordance with the present invention which are identical to the pouch shown in FIG. 1, except that the pouches of FIGS. 6–10 comprise a pour spout 445, 545, 645, 745, 845. In each of the pouches of FIGS. 6–10, the pour spout is formed from a sealed portion which extends generally between the top edge and the right and/or left lateral edges of the pouch. In FIG. 6, the pour spout 445 is formed as a channel 447 which extends from the inner cavity 435 of the pouch 420 generally toward the center of the top edge 424 of the pouch 420. The pour spout 545 of FIG. 8 is in many respects similar to the pour spout 445 shown in FIG. 6. However, the pour spout 545 of FIG. 8 extends vertically toward a corner 538 of the pouch 520. As can be readily seen by comparing FIG. 8 with FIG. 6, a pouch having the pour spout 545 of FIG. 8 holds more fluid than a similarly sized pouch having the pour spout 445 of FIG. 6. In FIG. 7, the pour spout 645 is formed as a channel 647 which extends generally away from the inner cavity 635 toward a corner 638 of the pouch 620. The end of the channel 647 nearest the corner 638 of the pouch 620 is shaped to form a generally triangular section 658. The triangular section 658 enables the pour spout 645, when opened, to provide a dispensing orifice which is wider than the channel 647. Such a dispensing opening is able to flare out as fluid is dispensed therethrough, thus facilitating removal of the fluid from the pouch 620. The pour spouts 745, 845 of FIGS. 9 and 10 are essentially the same as the pour spout 645 shown in FIG. 7. However, the pour spouts 745, 845 of FIGS. 9 and 10 differ from each other, and from the pour spout 645 of FIG. 7, in the relative dimensions of the channel 747, 847 (i.e., the length and width of the channel) and the size of the triangular section 758, 858. The pour spouts 645, 745, 845 of FIGS. 7, 9, and 10 are particularly well suited for dispensing high viscosity fluids.

Figure 11:
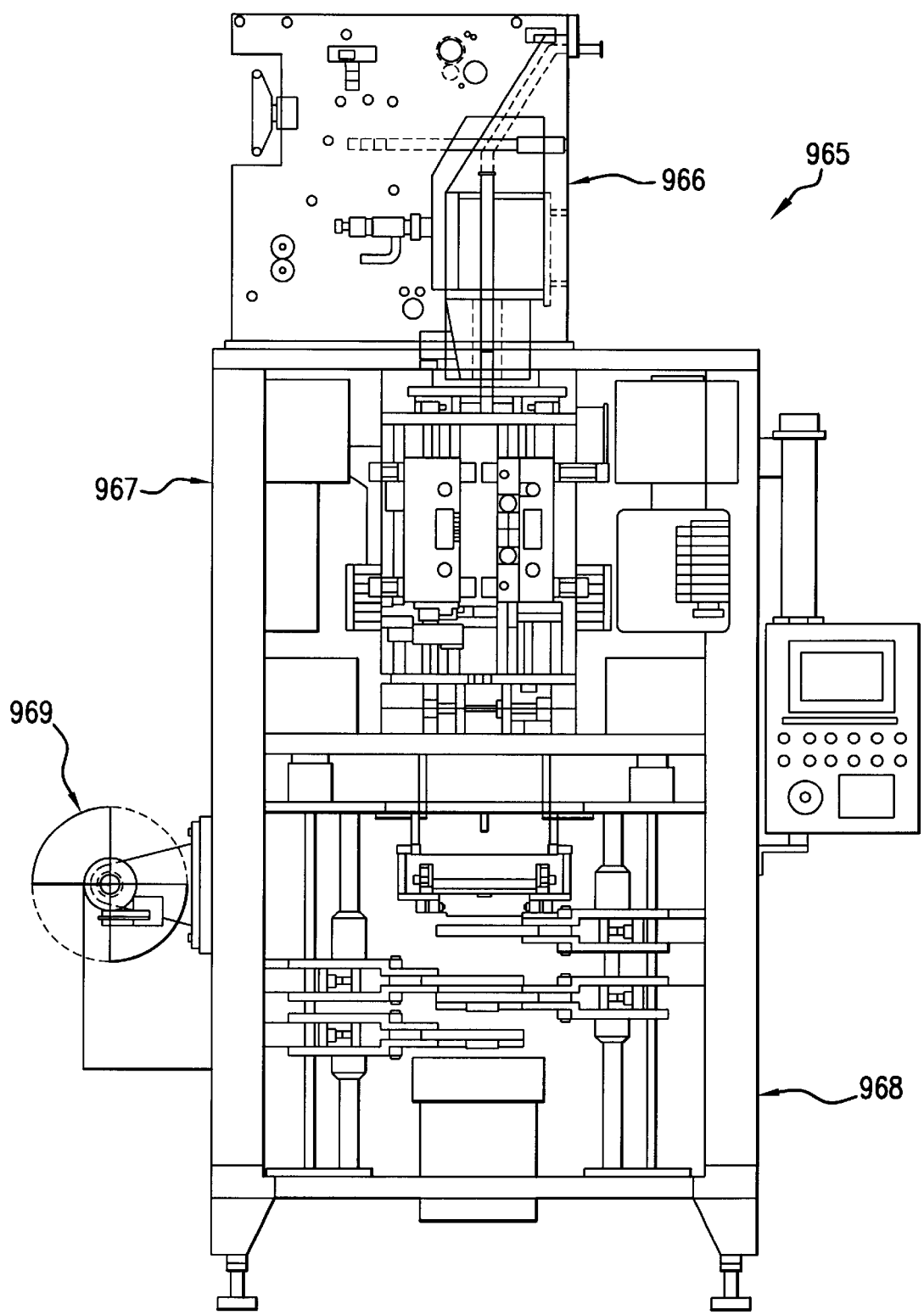
FIG. 11 is a schematic view of an apparatus in accordance with the present invention for producing a pouch.

The present invention further relates to an apparatus for producing a contoured pouch having a pour spout. A preferred apparatus 965 for use in connection with the present invention is shown schematically in FIG. 11 and described in, for example, published European Patent Application No. 98402857.1 (Publication No. EP 0 917 946). In brief, the apparatus 965 is a vertical form-fill-seal machine comprising a folding mechanism 966, a first sealing mechanism 967, and a second sealing mechanism 968. The folding mechanism 966 receives a pouch material from a roll or web 969 and folds the pouch material to provide a front panel, a rear panel, and a gusset. The folded web material is then fed into the first sealing mechanism 967 where the front and rear panels are heat sealed along a straight line at their top edges using a top seal bar and the gusset is sealed to the front and rear panels using a bottom seal bar. The web material is then fed to the second sealing mechanism 968 where one of the lateral edges of the front and rear panels are sealed together along a straight line using an end seal bar, the inner cavity of the pouch is filled with fluid, and the other lateral edge of the front and rear panels is sealed and cut along a straight line using a cutting bar. In the particular apparatus described in European Patent Application No. 98402857.1, squeeze rollers are provided to minimize the headspace within the sealed pouches. However, it will be appreciated that any of a variety of conventional machines, including pillow-type pouch forming machines, can also be used in connection with the present invention.

Figure 17:
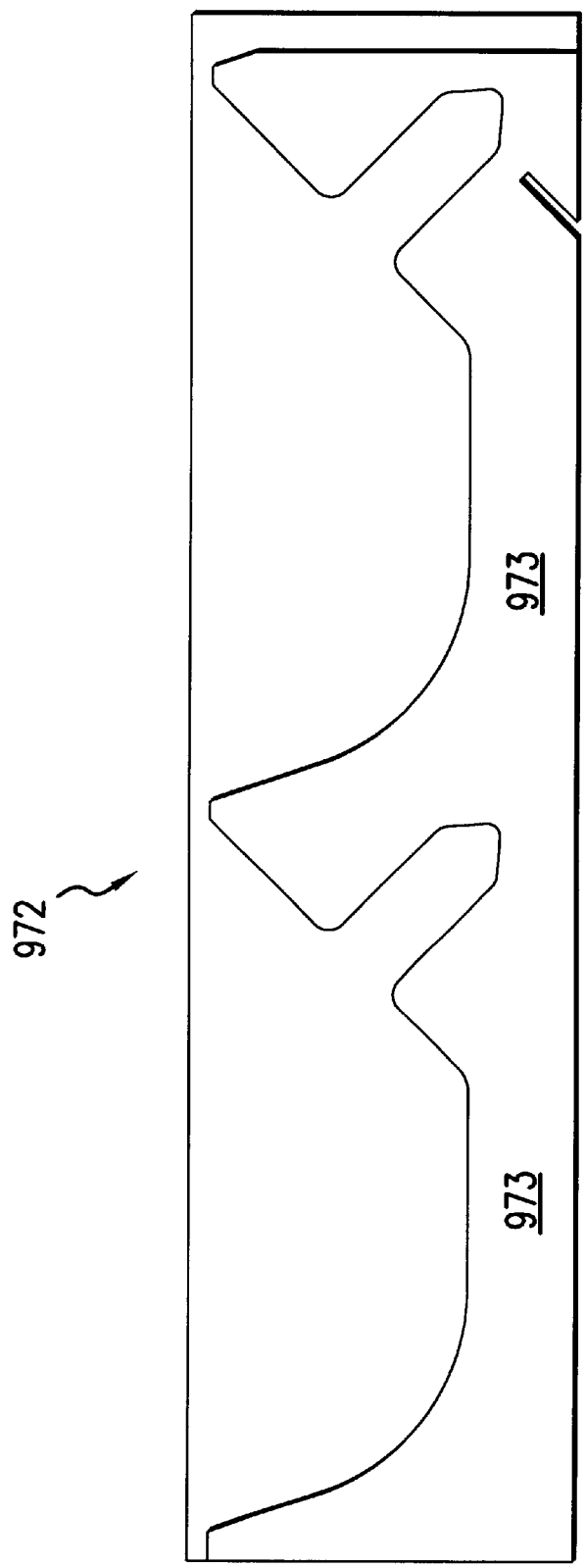
FIG. 17 is a front elevational view of a top seal bar in accordance with the present invention.

The present inventor has recognized that the apparatus described in European Patent Application No. 98402857.1 can be modified to produce pouches in accordance with the present invention. Toward that end, a top seal bar 972, useful for producing pouches of the type shown in FIGS. 4 and 5, is depicted in FIG. 17. As can be seen from the figure, the top seal bar 972 comprises raised portions 973 which are shaped to provide the pour spout and the rounded corners that are part of the final product. Similar top seal bars can be constructed for the other pouch configurations described above.

Figure 18:
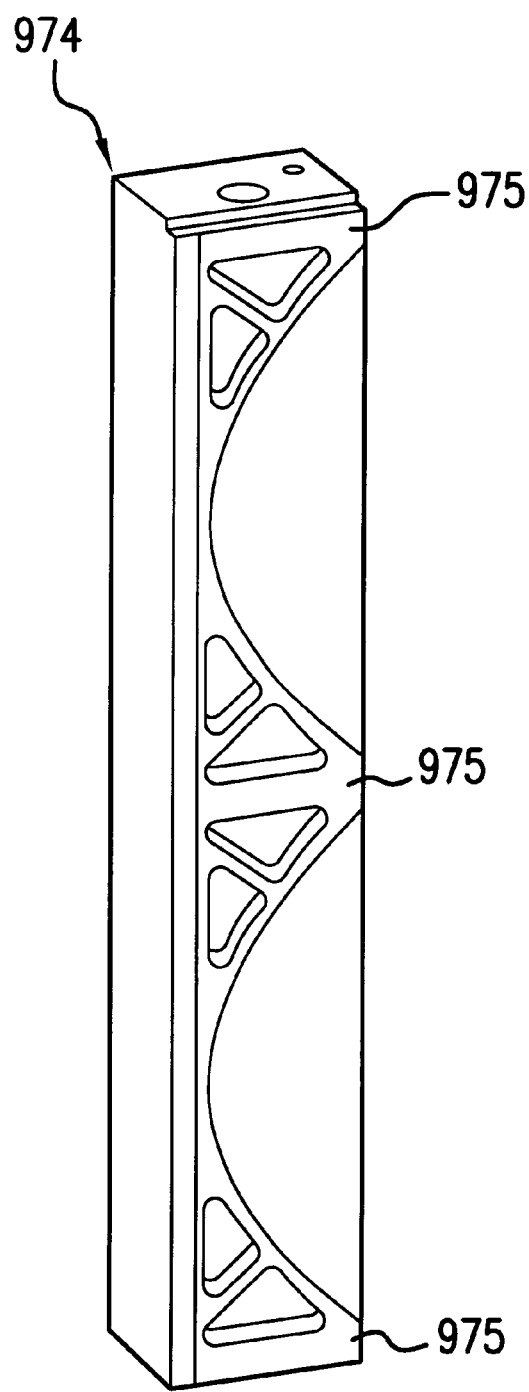
FIG. 18 is a perspective view of a bottom seal bar in accordance with the present invention.

A bottom seal bar 974 for producing pouches as depicted in FIGS. 3–5 is shown in FIG. 18. The bottom seal bar 974 comprises a raised portion 975 which seal the gusset to the front and rear panels. The seal bar 974 produces unsealed sections of the gusset, similar to unsealed sections 239 shown, for example, in FIG. 3. It will be appreciated that similar bottom seal bars could be produced to provide for alternative sealing configurations, such as the configurations depicted in other embodiments of the present invention.

Figure 12B:
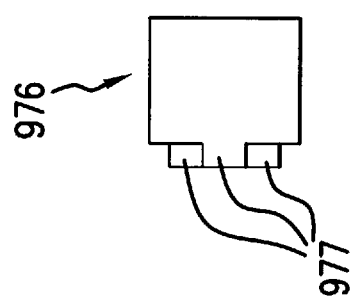
FIG. 12*b* is a side elevational view of the end seal bar of FIG. 12*a*.
Figure 12A:
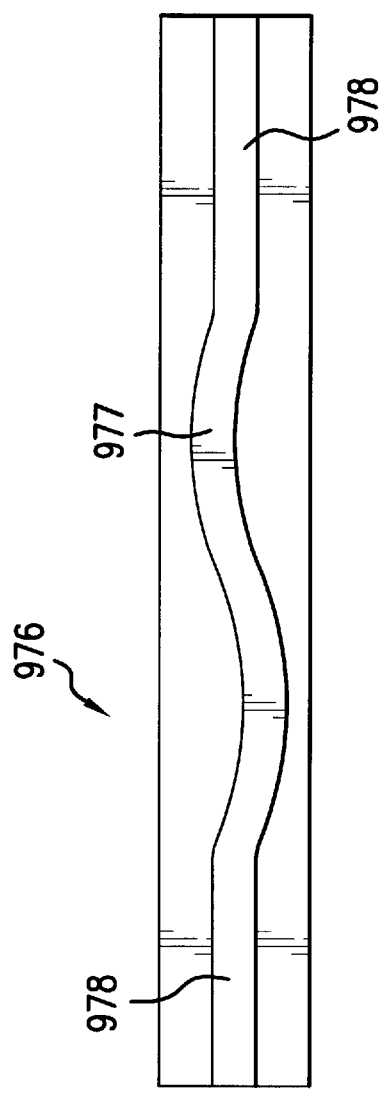
FIG. 12*a* is a front elevational view of an end seal bar in accordance with the present invention.

An end seal bar 976 for producing pouches having contoured lateral edges in accordance with the present invention is depicted in FIGS. 12a and 12b. The end seal bar 976 comprises a raised portion 977 which is shaped to provide a concave surface and a convex surface. The concave and convex surfaces form a non-rectilinear and, preferably, generally S-shaped section. The end seal bar 976 also optionally comprises raised rectilinear portions 978 positioned near those sections of the end seal bar 976 which will form the top and bottom edges of the pouch. Although the body of the end seal bar 976 is depicted as a rectangular block, it will be appreciated that the body of the end seal bar 976 can be shaped similarly to the raised portion 977.

As shown, the raised portions 973, 975, 977 of the top, bottom and end seal bars 972, 974, 976 present a smooth surface. However, the raised portions may comprise two or more raised ribs. The raised ribs create a ribbed seal which, in certain instances, can be desired over a smooth seal. For example, when the pouch is to contain a more viscous fluid or a substance having solid parts (such as seeds), fluid or solids trapped between the edges of the front and rear panels of the pouch are pushed out of the way by the raised ribs during sealing and, thus, do not interfere with the sealing process. Additionally, the ribbed seals provide added rigidity to the pouch, which may be desired when a stand-up pouch is produced.

A cutting bar 979 for producing pouches having contoured lateral edges in accordance with the present invention is depicted in FIGS. 14a and 14b. The cutting bar 979, like the end seal bar 976, comprises a raised portion 980 shaped to provide a concave surface and a convex surface which form a non-rectilinear and, preferably, generally S-shaped section. The cutting bar 979 also optionally comprises raised rectilinear portions 981 positioned near those sections of the cutting bar 979 which will form the top and bottom edges of the pouch. In particular, the cutting bar 979 is shaped and arranged, relative to the end seal bar 976, within the apparatus 965 of FIG. 11 such that the raised portion 980 of the cutting bar 979 lies substantially along the seal produced by the end seal bar 979 when adjacent pouches are being separated. Although the body of the cutting bar 979 is depicted as a rectangular block, it will be appreciated that the body of the cutting bar 979 can be shaped similarly to the raised portion 980.

The cutting bar 979 also comprises a curved blade 984 positioned within a groove 985. The curved blade 984 is used to sever each pouch from adjacent pouches. The cutting blade 984 is depicted in FIGS. 15a and 15b. The blade 984, like the raised portions 980, 977 of the cutting and end seal bars 979, 976, also contains concave and convex surfaces, as well as optional rectilinear surfaces. Specifically, the concave, convex, and rectilinear surfaces of the blade 984 are sized and shaped to fit within the groove 985. As shown in FIG. 15a, the blade 984 may optionally be tapered along its longitudinal axis. Tapering ensures that the wider end of the blade 984 contacts the pouch material first during cutting of the pouches. Cutting the pouches from one end toward the other provides a smoother cutting motion and, thus, results in a better finished product. The blade 984 may further contain teeth (not shown) to facilitate cutting. The blade 984 may be formed by bending a flat section of material, such as stainless steel. Alternatively, the blade 984 may be laser cut from a solid bar of material in order to provide a smoother contour.

Figure 13B:
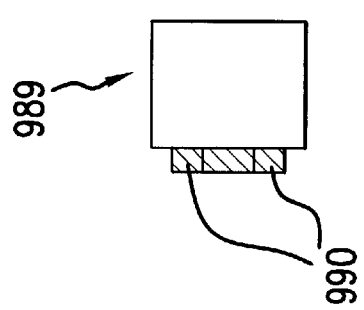
FIG. 13*b* is a side elevational view of the end backing seal bar of FIG. 13*a*.
Figure 13A:
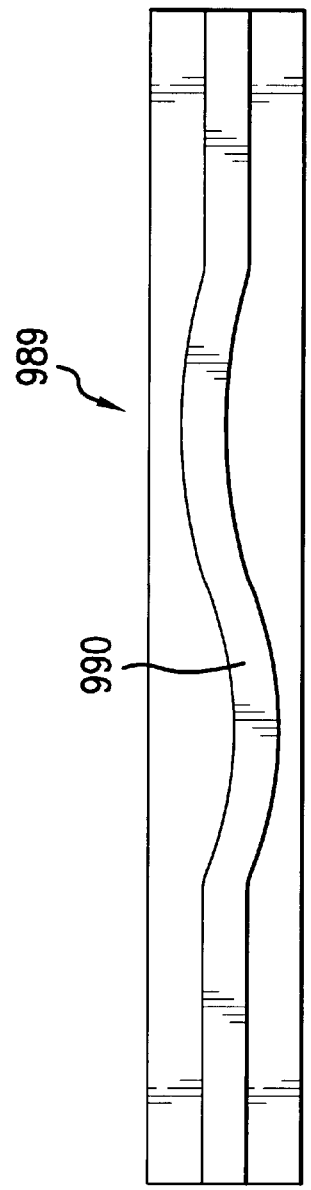
FIG. 13*a* is a front elevational view of an end seal backing bar in accordance with the present invention.

The top seal, bottom seal, end seal, and cutting bars 972, 974, 976, 979 can be made from a variety of materials. For example, the bars can be manufactured from aluminum, brass, or steel. Further, the bars can optionally be Teflon® coated. To provide optimum contact between the sealing bars 972, 974, 976 and the pouch, each of the sealing bars 972, 974, 976 "mates" with a corresponding seal backing bar. Each seal backing bar is preferably configured as the mirror image of its correlating sealing bar 972, 974, 976, so that when the seal backing bar and its corresponding sealing bar are mated with the pouch material therebetween, the seal backing bar provides uniform contact between the sealing bar and the pouch material. For example, an end seal backing bar is shown in FIGS. 13a and 13b. End seal backing bar 989 is configured to mate with end seal bar 976. Toward that end, the seal backing bar 989 preferably has a raised portion 990 made of a resilient material such as rubber. Alternatively, the raised portions 990 of the end seal backing bar 989 can be generally rectangular provided that the raised portion 990 of the end seal backing bar 989 provides uniform contact between the sealing bar 976 and the pouch material over substantially all of the surface of the raised portion 977 of the end seal bar 976. Although the body of the end seal backing bar 989 is depicted as a rectangular block, it will be appreciated that the bodies of the seal backing bars can be shaped similarly to the raised portions.

Similar to the seal backing bars is the cutting backing bar 993 depicted in FIGS. 16*a* and 16*b*. The cutting backing bar 993 has a raised portion 994 that is generally shaped as the mirror image of the cutting bar 979. Alternatively, the raised portion 994 of the cutting backing bar 993 can be generally rectangular, provided that the cutting backing bar 993 provides uniform contact between the cutting bar 979 and the pouch material over substantially all of the surface of the raised portion 980 of the cutting bar 979. However, instead of the blade 984, the cutting backing bar 993 comprises a groove 995 for receiving the blade 984 of the cutting bar 979 when the cutting backing bar 993 and the cutting bar 979 are mated. In one embodiment, the cutting backing bar 993 is further provided with a source of coolant, such as flowing water, in order to cool the sealed pouch material during cutting and, thereby, provide a superior seal. Although the body of the cutting backing bar 993 is depicted as a rectangular block, it will be appreciated that the body of the cutting backing bar 993 can be shaped similarly to the raised portion.

In operation, a pouch according to the present invention can be formed by assembling the pouch from at least one web of pouch-forming material on a vertical form-fill-seal machine. The pouch is preferably assembled using a folding mechanism to fold a single web of pouch-forming material into the shape of the pouch. Alternatively, the front panel, rear panel, and optional gusset of the pouch can be assembled as individual pieces fabricated from two or more webs.

A top edge, a bottom edge, and a first lateral edge of the pouch are then sealed. The bottom edge is sealed using the bottom seal bar and bottom backing bar. Similarly, the top edge is sealed using the top seal bar and top backing bar The first lateral edge of the pouch is also sealed, using the end seal bar and end backing bar, to provide a substantially S-shaped lateral edge. It will be appreciated that the top, bottom, and first lateral edges can be sealed in any order.

The pouch is then filled with a fill material and a second lateral edge of the pouch sealed, using the same or different end seal and end backing bars, to provide a substantially S-shaped second lateral edge. It will be apparent that the filling and second lateral edge sealing steps can occur simultaneously. The sealed and filled pouch can be cut, using the cutting and cutting backing bars, along the substantially S-shaped second lateral edge.

Those skilled in the art will appreciate that numerous changes and modifications may be made to the preferred embodiments of the invention and that such changes and modifications may be made without departing from the spirit of the invention. For example, although the present invention has been described in connection with a stand-up pouch, the present invention is also applicable for use with other types of pouches, including pillow-type pouches. Further, although the apparatus of the present invention has been described in connection with a vertical form-fill-seal machine, the present invention is equally applicable for use in horizontal machines. It is therefore intended that the appended claims cover all equivalent variations as fall within the true scope and spirit of the invention.

What is claimed is:

1. A pouch comprising a first lateral edge and a second lateral edge, each of the first and the second lateral edges comprising a concave surface and a convex surface, wherein the concave surface of the first lateral edge is substantially opposite the convex surface of the second lateral edge and the convex surface of the first lateral edge is substantially opposite the concave surface of the second lateral edge, wherein each of the first and the second lateral edges comprises at least one rectilinear portion.

2. The pouch of claim 1 wherein said at least one rectilinear portion of each of the first and the second lateral edges is positioned near a top of the pouch.

3. The pouch of claim 1 wherein said at least one rectilinear portion of each of the first and the second lateral edges is positioned near a bottom of the pouch.

4. A pouch comprising a first lateral edge and a second lateral edge, each of the first and the second lateral edges comprising a concave surface and a convex surface, wherein the concave surface of the first lateral edge is substantially opposite the convex surface of the second lateral edge and the convex surface of the first lateral edge is substantially opposite the concave surface of the second lateral edge, wherein each of the first and the second lateral edges comprises a first rectilinear portion and a second rectilinear portion, the first rectilinear portion of each lateral edge being positioned near a top of the pouch and the second rectilinear portion of each lateral edge being positioned near a bottom of the pouch.

5. A pouch comprising a first lateral edge and a second lateral edge, each of the first and the second lateral edges comprising a concave surface and a convex surface, wherein the concave surface of the first lateral edge is substantially opposite the convex surface of the second lateral edge and the convex surface of the first lateral edge is substantially opposite the concave surface of the second lateral edge, wherein the pouch comprises a base for supporting the pouch in an upright position.

6. The pouch of claim 5 wherein the base comprises a curved section.

7. A pouch comprising a first lateral edge and a second lateral edge, each of the first and the second lateral edges comprising a concave surface and a convex surface, wherein the concave surface of the first lateral edge is substantially opposite the convex surface of the second lateral edge and the convex surface of the first lateral edge is substantially opposite the concave surface of the second lateral edge, wherein the pouch comprises a pour spout defined by a channel in a sealed edge of the pouch communicating with the inner cavity of the pouch.

8. The pouch of claim 7 wherein the channel defines a drinking straw.

9. The pouch of claim 7 wherein the pour spout comprises a first sealed edge portion, a slit positioned in the first sealed edge portion, and a second sealed edge portion having a ribbed section and a non-ribbed section, the non-ribbed section of the second sealed edge portion being substantially opposite the slit.

10. A pouch comprising a first lateral edge and a second lateral edge, each of the first and the second lateral edges comprising a non-rectilinear portion, wherein a distance between the first and the second lateral edges is substantially the same for all elevations of the pouch, wherein each of the first and the second lateral edges comprises at least one rectilinear portion.

11. The pouch of claim 10 wherein said at least one rectilinear portion of each of the first and the second lateral edges is positioned near a top of the pouch.

12. The pouch of claim 10 wherein said at least one rectilinear portion of each of the first and the second lateral edges is positioned near a bottom of the pouch.

13. A pouch comprising a first lateral edge and a second lateral edge, each of the first and the second lateral edges comprising a non-rectilinear portion, wherein a distance between the first and the second lateral edges is substantially the same for all elevations of the pouch, wherein each of the first and the second lateral edges comprises a first rectilinear portion and a second rectilinear portion, the first rectilinear portion of each lateral edge being positioned near a top of the pouch and the second rectilinear portion of each lateral edge being positioned near a bottom of the pouch.

14. A pouch comprising a first lateral edge and a second lateral edge, each of the first and the second lateral edges comprising a non-rectilinear portion, wherein a distance between the first and the second lateral edges is substantially the same for all elevations of the pouch, wherein the pouch comprises a base for supporting the pouch in an upright position.

15. The pouch of claim 14 wherein the base comprises a curved section.

16. A pouch comprising a first lateral edge and a second lateral edge, each of the first and the second lateral edges comprising a non-rectilinear portion, wherein a distance between the first and the second lateral edges is substantially the same for all elevations of the pouch, wherein the pouch comprises a pour spout.

17. The pouch of claim 16 wherein the channel defines a drinking straw.

18. The pouch of claim 16 wherein the pour spout comprises a first sealed edge portion, a slit positioned in the first sealed edge portion, and a second sealed edge portion having a ribbed section and a non-ribbed section, the non-ribbed section of the second sealed edge portion being substantially opposite the slit.

19. A pouch comprising opposing flexible panels having first and second lateral edges, a bottom edge, and a top edge, at least the first lateral edge and the second lateral edge being sealed, defining an inner cavity; and a pour spout defined by a channel in a sealed edge of the pouch communicating with the inner cavity of the pouch; wherein each of the first and the second lateral edges comprises a non-rectilinear portion and at least one rectilinear portion positioned near a bottom of the pouch, and wherein a distance between the first and the second lateral edges is substantially the same for all elevations of the pouch.

* * * * *